US006796904B2

(12) United States Patent
Yoseloff

(10) Patent No.: US 6,796,904 B2
(45) **Date of Patent: *Sep. 28, 2004**

(54) METHOD OF SCORING A VIDEO WAGERING GAME

(75) Inventor: Mark L. Yoseloff, Henderson, NV (US)

(73) Assignee: IGT, Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/254,903

(22) Filed: Sep. 24, 2002

(65) Prior Publication Data

US 2003/0032475 A1 Feb. 13, 2003

Related U.S. Application Data

(63) Continuation of application No. 09/541,846, filed on Apr. 3, 2000, now Pat. No. 6,454,651, which is a continuation-in-part of application No. 08/820,438, filed on Mar. 12, 1997, now Pat. No. 6,179,711.

(51) Int. Cl.[7] .......................... A63F 13/00; A63F 9/24; G06F 17/00; G06F 19/00

(52) U.S. Cl. ............................ 463/25; 463/16; 463/21; 463/22; 273/139; 700/90; 700/91

(58) Field of Search ............................. 463/25, 16, 17, 463/18, 19, 20, 21, 26, 27, 22, 9, 10, 11, 12, 13; 273/138.1, 138.2, 139, 148 R, 149 R, 148 B; 700/90, 91, 92, 93

(56) References Cited

U.S. PATENT DOCUMENTS

| | | | | |
|---|---|---|---|---|
| 4,258,838 A | | 3/1981 | Rockola et al. | |
| 4,624,459 A | | 11/1986 | Kaufman | |
| 4,805,907 A | | 2/1989 | Hagiwara | |
| 4,836,553 A | | 6/1989 | Suttle et al. | |
| 4,861,041 A | | 8/1989 | Jones et al. | |
| 4,871,171 A | * | 10/1989 | Rivero | 463/20 |
| 5,019,973 A | | 5/1991 | Wilcox et al. | |
| 5,033,744 A | | 7/1991 | Bridgeman et al. | |

(List continued on next page.)

FOREIGN PATENT DOCUMENTS

GB 2 083 936 A 3/1982 ........... G07F/17/34

*Primary Examiner*—Jessica Harrison
*Assistant Examiner*—Binh-An D. Nguyen
(74) *Attorney, Agent, or Firm*—Bell, Boyd & Lloyd, LLC

(57) ABSTRACT

A method of scoring a video wagering game is disclosed. The method includes placing a wager to participate in a video wagering game, and playing a first segment of the game. The first segment is played until a set of predetermined conditions has been met. A payout value is assigned to a winning outcome of the first segment. When the predetermined conditions have been met, the player plays a second segment of the game. The outcome of the second segment determines a factor that is at least equal to one. The payout value assigned to the first segment is multiplied by the factor to determine the game payout.

18 Claims, 7 Drawing Sheets

U.S. PATENT DOCUMENTS

| | | | | | |
|---|---|---|---|---|---|
| 5,098,107 | A | | 3/1992 | Boylan et al. | |
| 5,167,413 | A | | 12/1992 | Fulton | |
| 5,205,555 | A | * | 4/1993 | Hamano | 273/143 R |
| 5,249,800 | A | | 10/1993 | Hilgendorf et al. | |
| 5,259,616 | A | * | 11/1993 | Bergmann | 463/17 |
| 5,288,077 | A | | 2/1994 | Jones | |
| 5,288,081 | A | | 2/1994 | Breeding | |
| 5,332,219 | A | | 7/1994 | Marnell, II et al. | |
| 5,342,049 | A | * | 8/1994 | Wichinsky et al. | 273/119 R |
| 5,364,105 | A | | 11/1994 | Jones | |
| 5,377,973 | A | | 1/1995 | Jones et al. | |
| 5,393,057 | A | | 2/1995 | Marnell, II | |
| 5,393,061 | A | | 2/1995 | Manship et al. | |
| 5,431,407 | A | | 7/1995 | Hofberg et al. | |
| 5,437,462 | A | * | 8/1995 | Breeding | 273/292 |
| 5,452,899 | A | | 9/1995 | Skratulia et al. | |
| 5,494,287 | A | | 2/1996 | Manz | |
| 5,511,781 | A | | 4/1996 | Wood et al. | |
| 5,529,309 | A | | 6/1996 | Bartlett | |
| 5,531,440 | A | | 7/1996 | Dabrowski et al. | |
| 5,531,441 | A | | 7/1996 | Dabrowski et al. | |
| 5,542,669 | A | | 8/1996 | Charron et al. | |
| 5,577,731 | A | | 11/1996 | Jones | |
| 5,584,485 | A | | 12/1996 | Jones et al. | |
| 5,607,162 | A | | 3/1997 | Boylan et al. | |
| 5,626,341 | A | | 5/1997 | Jones et al. | |
| 5,660,391 | A | | 8/1997 | Klasee | |
| 5,660,393 | A | | 8/1997 | Dreger | |
| 5,664,781 | A | | 9/1997 | Feola | |
| 5,794,964 | A | | 8/1998 | Jones et al. | |
| 5,795,225 | A | | 8/1998 | Jones et al. | |
| 5,823,874 | A | | 10/1998 | Adams | |
| 5,848,932 | A | | 12/1998 | Adams | |
| 6,004,207 | A | | 12/1999 | Wilson, Jr. et al. | |
| 6,179,711 | B1 | * | 1/2001 | Yoseloff | 463/25 |
| 6,454,266 | B1 | * | 9/2002 | Breeding et al. | 273/292 |
| 6,454,651 | B1 | * | 9/2002 | Yoseloff | 463/25 |

* cited by examiner

METHOD OF SCORING A VIDEO WAGERING GAME

RELATED APPLICATIONS

This application is a continuation application claiming priority under 35 U.S.C. 120 from U.S. patent application Ser. No. 09/541,846, filed Apr. 30, 2000, titled "METHOD OF SCORING A VIDEO WAGERING GAME," now U.S. Pat. No. 6,454,651, which is in turn a continuation-in-part of U.S. patent application Ser. No. 08/820,438, filed Mar. 12, 1997, titled "METHOD OF SCORING A VIDEO WAGERING GAME," now U.S. Pat. No. 6,179,711.

BACKGROUND OF THE INVENTION

The present invention relates to methods of playing video wagering games. In particular, it relates to a novel method of scoring a video wagering game.

Video wagering games are popular gaming devices in gaming establishments. A number of factors have contributed to the popularity of video wagering games. Gaming establishments have expanded the variety of games offered on video platforms beyond what was once limited to video poker, video keno and video reel slot machines. Many casino table games such as blackjack, draw poker, stud poker, Let It Ride® poker and Caribbean Stud Poker® are available on video, and can be learned on video machines before advancing to the more intimidating live table game environment. With video wagering, novice players can enjoy playing a wide variety of casino games without having to play at a table with other more experienced players. Players of video games need not worry about playing too slowly to suit the dealer or other players or about feeling embarrassed by making a particular strategic decision. Video wagering games often are capable of paying a progressive jackpot if the player achieves a predetermined winning outcome. For the above reasons, the video wagering format is growing at a pace which greatly exceeds the growth of play of live casino table games and other types of live wagering.

A more commonly known video wagering game is poker which is available in numerous variations. Other examples include video reel slot machines, and video keno. Video reel slot machines may simulate the play of a mechanical slot machine such as a three reel slot, for example. Because the "reels" are not limited by the geometry of a conventional slot reel, the game can provide a larger number of pay lines or of winning combinations than can a conventional mechanical slot machine.

Another very popular video wagering device is video poker. Numerous versions of video poker are available, including numerous versions of draw poker, stud poker, and more recently, Let It Ride® and Caribbean Stud® poker games. Some video platforms are loaded with a number of video wagering games. Many gaming establishments provide a number of poker game variations on one multi-game video platform.

Some known video wagering games, as well as games adapted for play on a home computer have a "second screen" feature. That is, if the player wins a certain number of games, or achieves a predetermined skill level in a game, a second screen will appear which either permits the player to play the same game at a higher skill level, or in the case of video wagering, provides another opportunity to play a different wagering game. For example, some video poker games offer a double-or-nothing feature. If a player has a winning hand in the first segment of the game, the player can optionally risk the amount won by trying to determine whether a given card will be higher or lower than 8. Alternatively the player may have to choose one of four cards in an attempt to get a card higher than one already shown. If the player wins, his original bet is doubled. He may continue to "double up" until he reaches some predetermined limit, or loses. However, if he loses, he loses the winnings from the first game. There also exist video wagering games that have a video slot segment and at least one additional video wagering segment. Additionally, there are known second screen games in which the winnings from the second screen game are unrelated to the winnings in the first screen game.

Although "second screen" games are generally known in the video game art, there has not been to the inventor's knowledge a multiple game segment video wagering game where the outcome of the second segment can directly enhance the payout of the first segment.

SUMMARY OF THE INVENTION

The present invention is a method of scoring a video wagering game. The game includes at least a first and second segment. For purposes of this disclosure, a "segment" is a video wagering game capable of being played as a stand alone game. The method comprises the steps of placing a wager to participate in a video wagering game, playing a first segment of the video wagering game, and continuing to play until at least one predetermined condition has been met. Preferably, there is more than one predetermined condition including achieving a predetermined number of winning outcomes or achieving one of a specific group of winning outcomes.

One condition for playing the second segment is to have a winning outcome and associated payout assigned for the first segment at the time the second segment is played. Once the predetermined condition or conditions have been met, the player plays the second segment of the wagering game. Every outcome of the second segment has a factor associated with it which enhances the payout of the first segment, by multiplying the original payout by the factor. According to the present invention, the minimum factor in the second segment is one. The player is therefore guaranteed a payout at least as great as the original payout, and hence does not risk the payout he was assigned in the first segment by playing the second segment of the game. Additionally, one or several predetermined outcomes of the second segment may be assigned fixed or progressive jackpots, yielding even larger winnings for the player.

DETAILED DESCRIPTION OF THE PREFERRED EMBODIMENTS

The present invention is a unique method for scoring a video wagering game. The preferred method can be used to score virtually any video wagering game having at least two distinct playing segments. Although the method of the present invention is preferably used to score video poker games, the method can be applied to virtually any segmented game where winning outcomes can be determined in advance, and at least one predetermined condition in the first segment can be identified in order to qualify the player to advance to the second segment of the game.

Although the examples described below do not require the player to place a wager to participate in the second segment, the present invention contemplates an optional or mandatory second wager requirement to participate in the second segment of the game.

Figure 1:
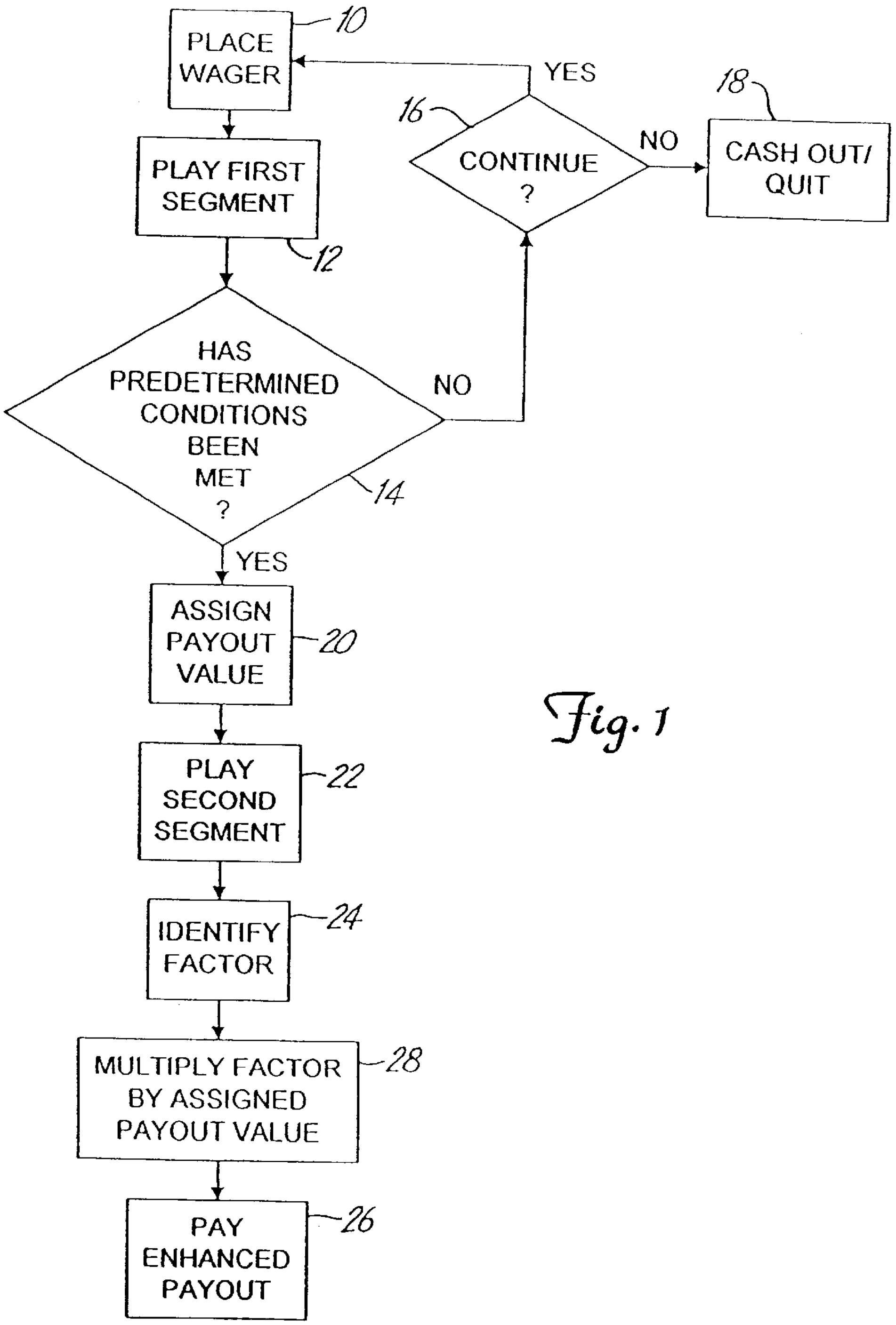
FIG. 1 is a flow diagram of the preferred method of the present invention.

A flow diagram of the method of the present invention is shown in FIG. 1. A player places a wager 10 to participate in a video wagering game. The player first plays the first segment 12. If at least one predetermined condition 14 has been met, a payout value 20 is assigned to the first segment of the game. Preferably, the player must repeat the wagering 10 and playing 12 steps a number of times before the predetermined set of conditions 14 has been met. Although it is preferred that the player continue to place wagers with each round of play of the first segment, the present invention contemplates placing only one wager. Between play of each number of the first segment 12, the player has the option to continue 16, or cash out and quit 18. Of course, if the player does not have any credits remaining, the player simply quits 18 playing the first segment.

According to the preferred game method, when the player has achieved a predetermined number of winning outcomes, the predetermined conditions has been met 14. When the set of predetermined conditions has been met 14, a payout value is assigned 20 to at least one predetermined winning outcome from the first segment. Preferably, the last predetermined winning outcome is the basis for assigning a payout value 20.

Next, the player participates in playing the second segment of the game. In a preferred embodiment, no additional wager is required to participate. The present invention contemplates providing an optional or required second wager to participate in the second segment. It is to be understood that the second wagering event would necessitate modifying the preferred pay tables of the present invention.

At the conclusion of play of the second segment 22, a factor is identified 24 and is assigned to the outcome, from a predetermined set of outcomes and corresponding factors. The factor is multiplied 28 by the assigned payout value from the first segment and the player is paid 26 that amount.

According to the present invention, payouts from the first segment are enhanced by multiplying the assigned payout value by a multiplication factor, hereinafter referred to simply as a "factor." Preferably, the factor is an integer equal to or greater than one. In other words, the player is not putting the payout of the first segment at risk by participating in play of the second segment. This unique feature adds fun and enjoyment to the game. Since there is no risk in participating in the second segment, there is really no reason why the player would choose not to participate. In fact, in the example described below, participation in the second segment is required.

The method of the present invention is particularly suited for video poker games. The present invention contemplates a first segment that is a variation of video poker. The scoring method of the present invention is suitable for scoring video wagering games with a first segment which is Stud Poker, Draw Poker, Caribbean Stud® Poker, Let It Ride® Poker, Jokers Wild Poker, and other poker variations. The method could be used in connection with other card games such as blackjack, for example. The method could also be adapted to scoring other video wagering games such as bingo, keno, hangman, solitaire, tick tack toe and video slot reel games, for example. Similarly, the second segment of the game can consist of all of the above, in addition to other games such as high/low, for example.

According to one preferred method of play, the first segment is Let It Ride® poker and the predetermined winning outcome of the first segment is achieving a known winning hand from a plurality of poker hands having conventional poker hand rankings, such as two pairs, for example. In the example which is described below, the minimum ranking poker hand required to meet the predetermined conditions is a pair of 9's. According to the invention, there must be a payout to meet the predetermined conditions.

Wagers are placed according to conventional play of video wagering games. For example, a player may insert coins, bills, tokens or register credits in another manner to participate in the game. Playing the first segment can either take place automatically as the result of placing a wager, for example, or in response to instructions from the player transmitted to a microprocessor via player controls.

Figure 2:
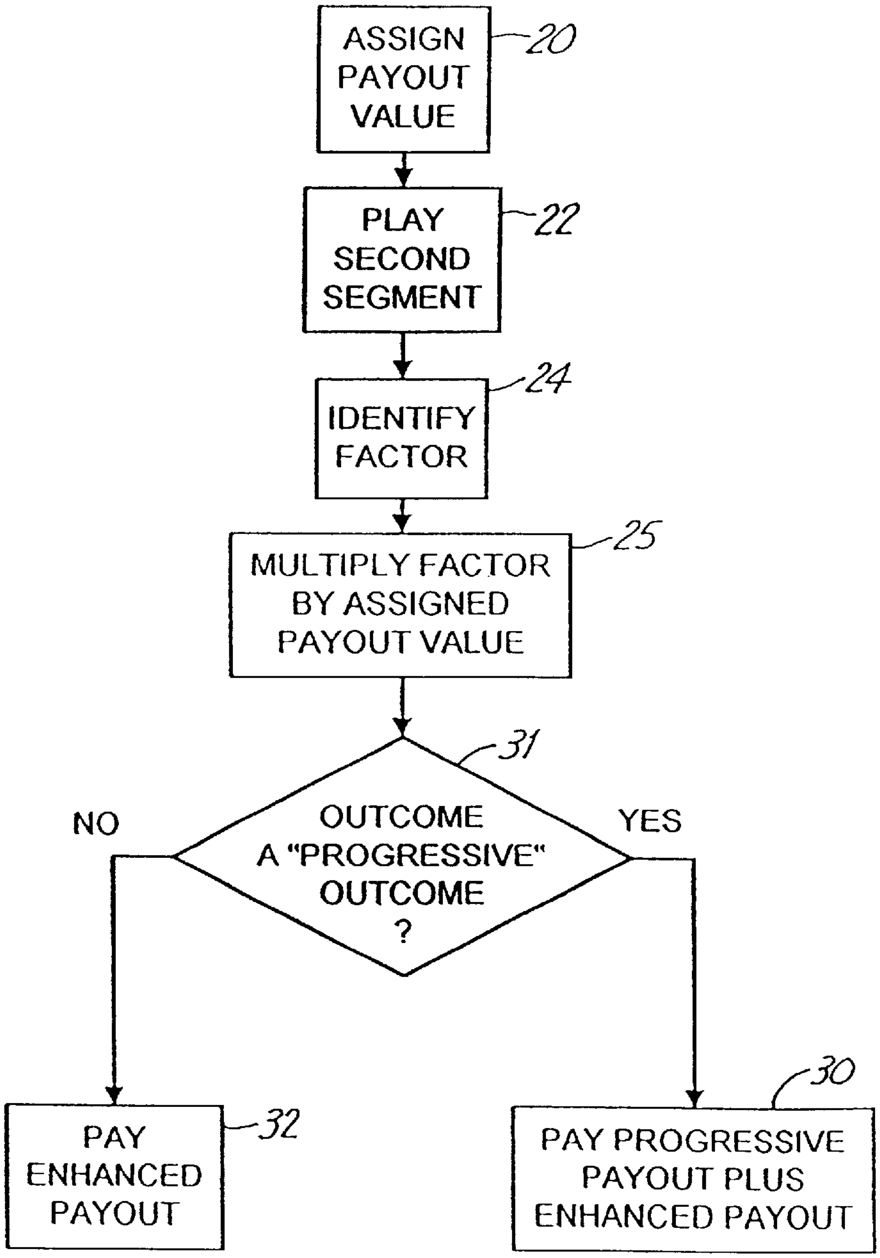
FIG. 2 is a flow diagram illustrating an optional progressive payout option of the method of the present invention.

A preferred method of play of the present invention includes providing a progressive payout in the event a predetermined winning combination is achieved in the second segment of the game. FIG. 2 is a flow diagram which shows how the progressive outcome is incorporated into a preferred method of scoring. One preferred condition for advancing to the second segment of the game is that for each winning outcome, the player has placed the maximum bet. In other words, the enhanced rewards to advance to the second segment are only possible if the player bets the maximum amount allowed by the video gaming device. It is not necessary that the player bet the maximum coin each time the first segment is played. However, only the winning outcomes from games played when the maximum coin is bet contribute to meeting the predetermined conditions.

As shown in FIG. 2, a preferred method of play includes enhancing the assigned payout 20 by paying a progressive payout 30. Preferably, only a portion of the predetermined winning outcomes qualify for a progressive payout. All outcomes according to the present invention are enhanced. If the factor 24 is one, the assigned payout value is enhanced because the player participated in playing the second segment without risking the winnings from the first segment. The assigned payout value 20 is multiplied 25 by the factor 24 to arrive at the enhanced payout 32. Although the winnings are not necessarily increased, they are enhanced because no wagers were put at risk by playing the game. If the winning outcome has been designated for a progressive payout 31, a progressive payout is made 30 in addition to the enhanced payout 32.

In one preferred example, the first and second segments are poker, and a royal flush qualifies for a progressive payout 30, as well as an enhanced payout 32, while a plurality of other winning poker hands qualify for an enhanced payout 32.

Figure 3:
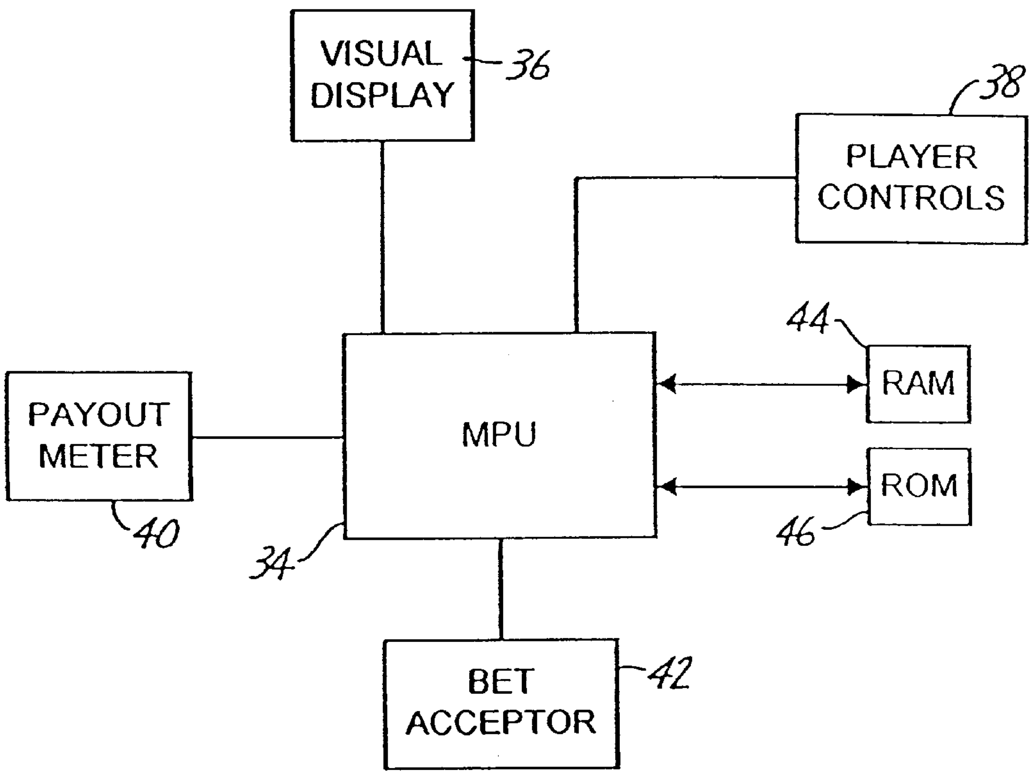
FIG. 3 is a schematic diagram showing the preferred device of the present invention.

A video wagering device of the present invention includes a microprocessor (MPU) 34, as shown in FIG. 3. The MPU can be a conventional home computer or other known microprocessor commonly used in gaming devices. A visual display 36 such as a cathode ray tube, for example is provided to show a visual representation of the video wagering game of the present invention. The visual display 36 and MPU 34 are mounted within a video terminal cabinet 36 (shown in FIG. 4). A plurality of player controls 38 are provided and are preferably mounted in the cabinet 36. The device is equipped with a payout meter 40 and a device for accepting bets 42. The MPU is equipped with RAM 44 memory, as well as ROM 46 memory. A program is loaded into the ROM memory 46 which provides visual images which correspond to the first and second game segments, and allow the player to input instructions into the RAM memory 44. Although the device and method of the present invention are described in terms of providing a two segment wagering game, it is to be understood that the game and device of the present invention can be used to provide video wagering games with more than two segments. The payout from the first game can be enhanced by outcomes in each successive game, for example.

The MPU is further programmed to register bets, credit bets, calculate payouts, continually check to see if all of the set of predetermined conditions have been met, determine if the winning outcome qualifies for a progressive payout, receive player instructions, dispense payouts and provide visual displays in response to player instructions. Each of the visual display, 36, the payout meter 40, the bet acceptor 42 and the player controls 38 are preferably electronically connected to the MPU 34 by means of a data bus.

Figure 4:
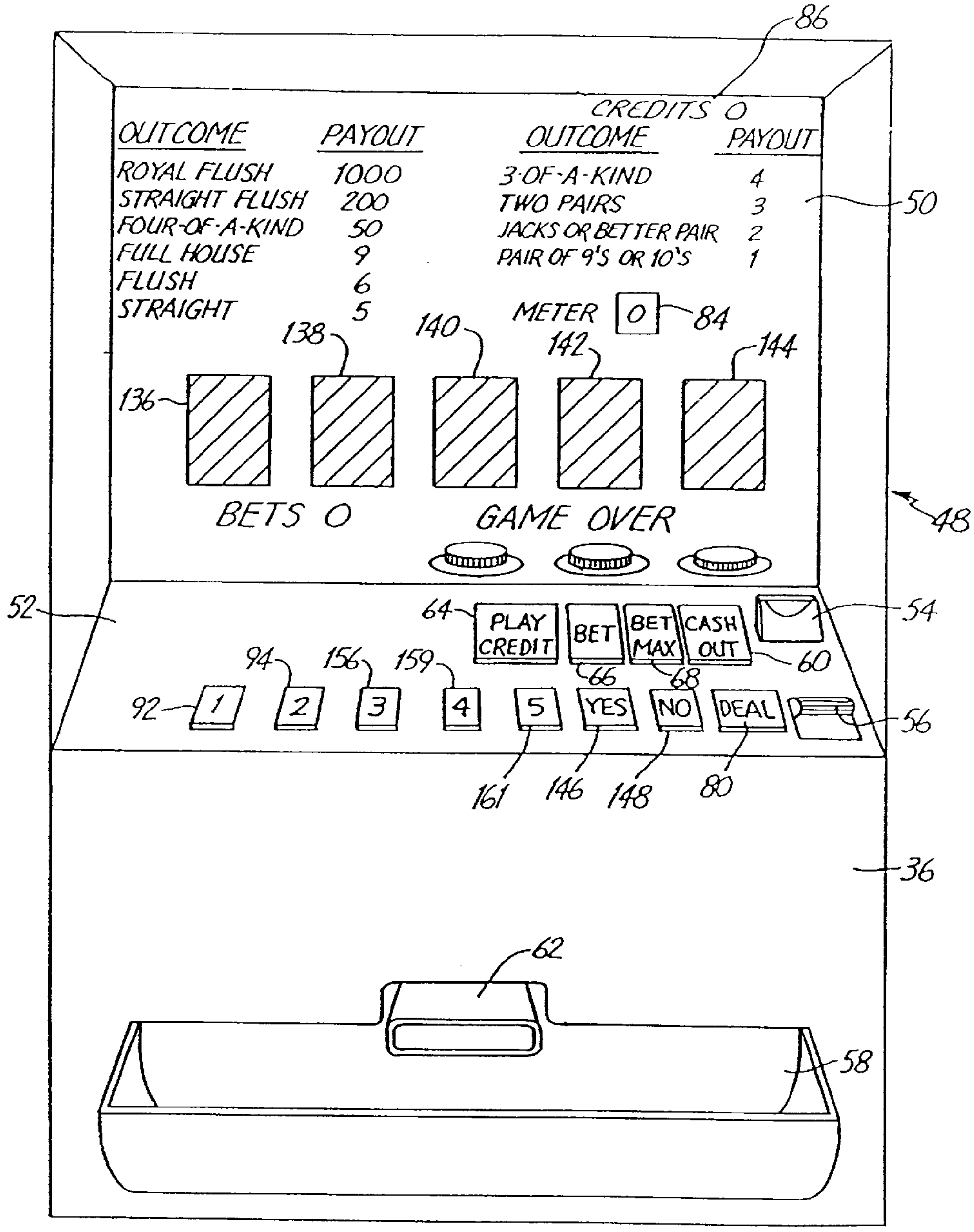
FIG. 4 is a front elevational view of a preferred video wagering machine of the present invention.

As shown in FIG. 4, in a preferred game of the present invention, a video wagering device 48 is provided with a visual display 50, a plurality of player controls 52 mounted into the cabinet 36, a coin acceptor 54, a bill acceptor 56 and a coin collection tray 58. The player controls 52 preferably include a plurality of numbered buttons 92, 94, 156, 159, and 161, "yes" and "no" buttons 146 and 148, "bet" 66, "Max bet" 68 and "play credit" 64 buttons, "cash out" 60 and a "deal" 80 button. If a player chooses to cash out winnings, the cash out button 60 is depressed, and all credited wins are dispensed through chute 62 into tray 58.

In a preferred method of the present invention, Let-It-Ride® poker is the first segment of the video wagering game, and ordinary stud poker is the second segment. Let-it-Ride® poker is fully described in U.S. Pat. No. 5,288,081 to Breeding and is hereby incorporated by reference. This patent is commonly owned by the assignee of the present invention.

Figure 5:
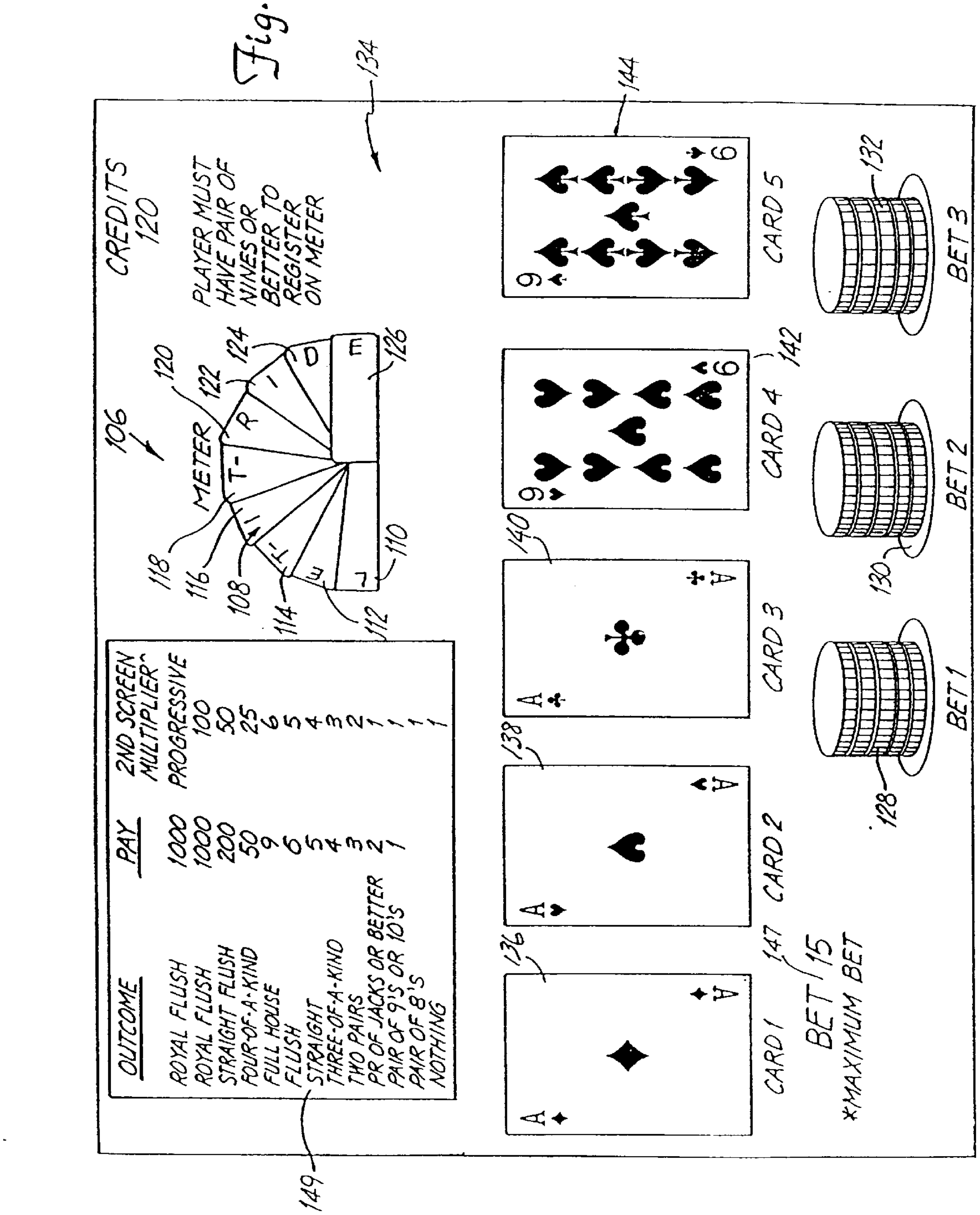
FIG. 5 is an illustration of a screen display for the first segment of the preferred game of the present invention.

In a preferred screen display 106, as shown in FIG. 5, a fanned shaped meter 108 is provided which represents nine playing cards 110, 112, 114, 116, 118, 120, 122, 124 and 126. Alternatively, a meter which is a numerical counter 84 (shown in FIG. 4) is provided. Any type of electronic, mechanical or electromechanical meter could be used. Preferably, the visual representation of each card 110, 112, 114, 116, 118, 120, 122, 124 and 126 includes a single letter on each card, which spells LET-IT-RIDE. There are a total of nine cards. When a winning combination of cards is achieved in the first segment of the game, one card in the fan is turned over, and appears as if it were filled in with a solid color (not shown). In this example, the meter 108 increments to nine, at which time the MPU causes the visual display to advance to the next segment, providing that the remaining predetermined conditions have been met.

The play of the underlying game is briefly described as follows. The player places a wager, which preferably is a three equal part bet. A visual display of the three parts of the bet 128, 130 and 132 is incorporated into the preferred screen display 134. A video representation of a five card hand is displayed. The cards is drawn randomly from a single deck of cards. Each card 136, 138, 140, 142 and 144 are dealt face down. After the player places his wager, he depresses the deal button 80 (shown in FIG. 4). The first three cards 136, 138 and 140 are turned face up, and the remaining two cards 142 and 144 remain turned down. At this point, the player is given the opportunity to withdraw the first part of his bet, based on his assessment of the likelihood the hand will be a winning hand. If the player wishes to withdraw the bet, he depresses the "no" 148 button (see FIG. 4). In this instance, he has drawn three aces, which in itself is a winning hand. He therefore would choose to "let it ride," by selecting the "yes" button 146 and continue to maintain that portion of the bet. Once "yes" or "no" is chosen, the fourth card 142 is turned over. He is then given the opportunity to "let-it-ride" by pressing the "yes" button 146, or withdraw a second portion of his bet 130 by depressing the "no" button 148 on the player control panel. Since he has already determined that the hand is a winning hand, he would continue to "let it ride." Again, upon choosing "yes" or "no", the final card 144 is turned over, and the hand is scored. According to the preferred method of play, the payout for a full house is 9 for one. At the beginning of play, and before any bets are placed, the screen display 50 preferably shows zero credits 86 (shown in FIG. 4). Just prior to play of the last hand which increments the meter to the ninth position, the player has 120 credits. The player placed the maximum bet of fifteen coins which is shown at 147 on screen display 134. The player achieved a full house which is one predetermined arrangement of cards, and according to the preferred pay table, pays 9 for 1. The most preferred predetermined arrangements of cards, corresponding payouts and respective factors are shown in the table below:

| Outcome | Payout | Factors |
|---|---|---|
| Royal Flush (max. bet) | 1000 | progressive |
| Royal Flush | 1000 | 100 |
| Straight Flush | 200 | 50 |
| Four-of-a-kind | 50 | 25 |
| Full House | 9 | 6 |
| Flush | 6 | 5 |
| Straight | 5 | 4 |
| Three-of-a-kind | 4 | 3 |
| Two pairs | 3 | 2 |
| Jacks or better pair | 2 | 1 |
| pair of 9's or 10's | 1 | 1 |
| Low pair | | 1 |
| Nothing | | 1 |

This pay table 149 is preferably incorporated into the visual display 134 of the first segment. Alternatively, the MPU is programmed to display the type of winning hand, payout and factor for a single winning outcome only when that outcome is achieved. Displaying the factors provides the player with an incentive to continue to fill in the cards 110, 112, 114, 116, 118, 120, 122, 124 and 126 of the meter 108. The meter also creates an incentive to advance to the next screen because it motivates the player to finish what he has started.

Figure 6:
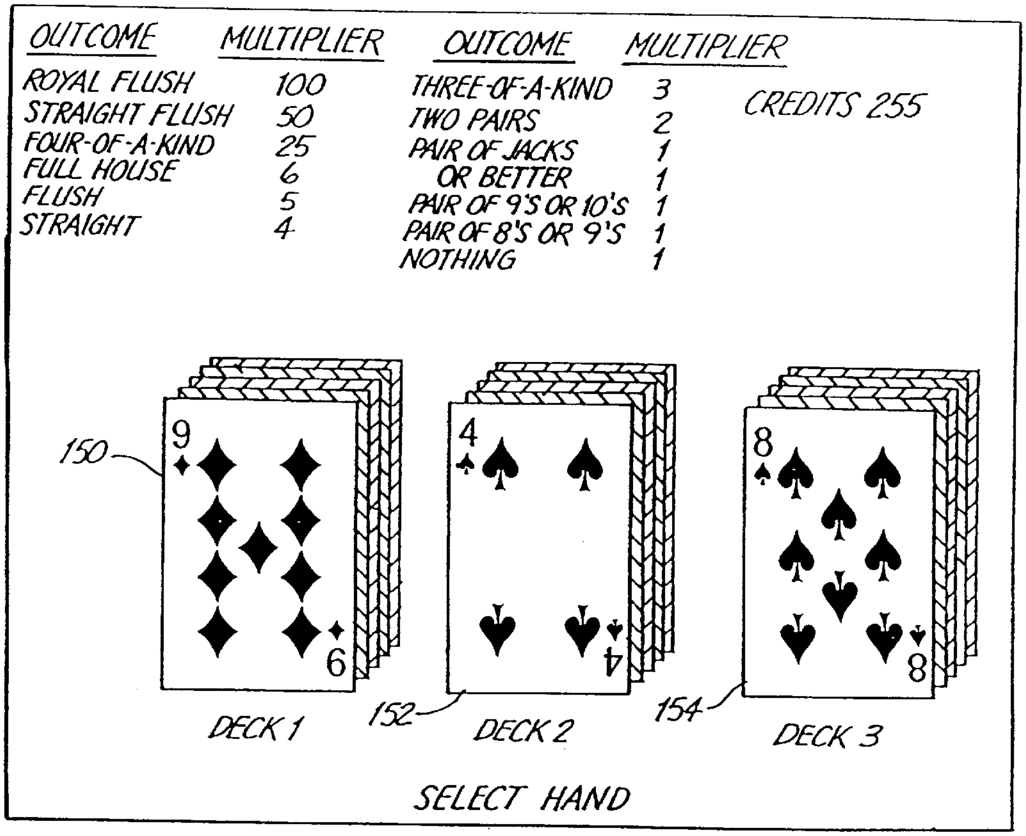
FIG. 6 is an illustration of a second screen display corresponding to a second segment of a preferred game of the present invention.

According to the preferred method, any winning hand ranking will increment the meter 108, providing that a maximum bet was wagered. A "winning" hand for purposes of this disclosure is one that has a payout, according to conventional poker hand rankings. When the last card 126 on the meter 108 is filled in, the MPU causes the screen display to advance to the next segment of the game, as shown in FIG. 6. FIG. 6 shows a video representation of three five card hands 150, 152 and 154 of cards. Each hand is randomly dealt from its own deck of cards. The top card in each hand is face up, which gives the player some information useful in deciding which hand to play The player selects the hand to play by depressing the one 92, two 94 or three button 156 (shown in FIG. 4). The credits increment to 255, which reflects the win on the last hand on a bet of 15 coins, paying 9 for 1. In this example, the player selects the first hand 150 by depressing the one button 92.

Figure 7:
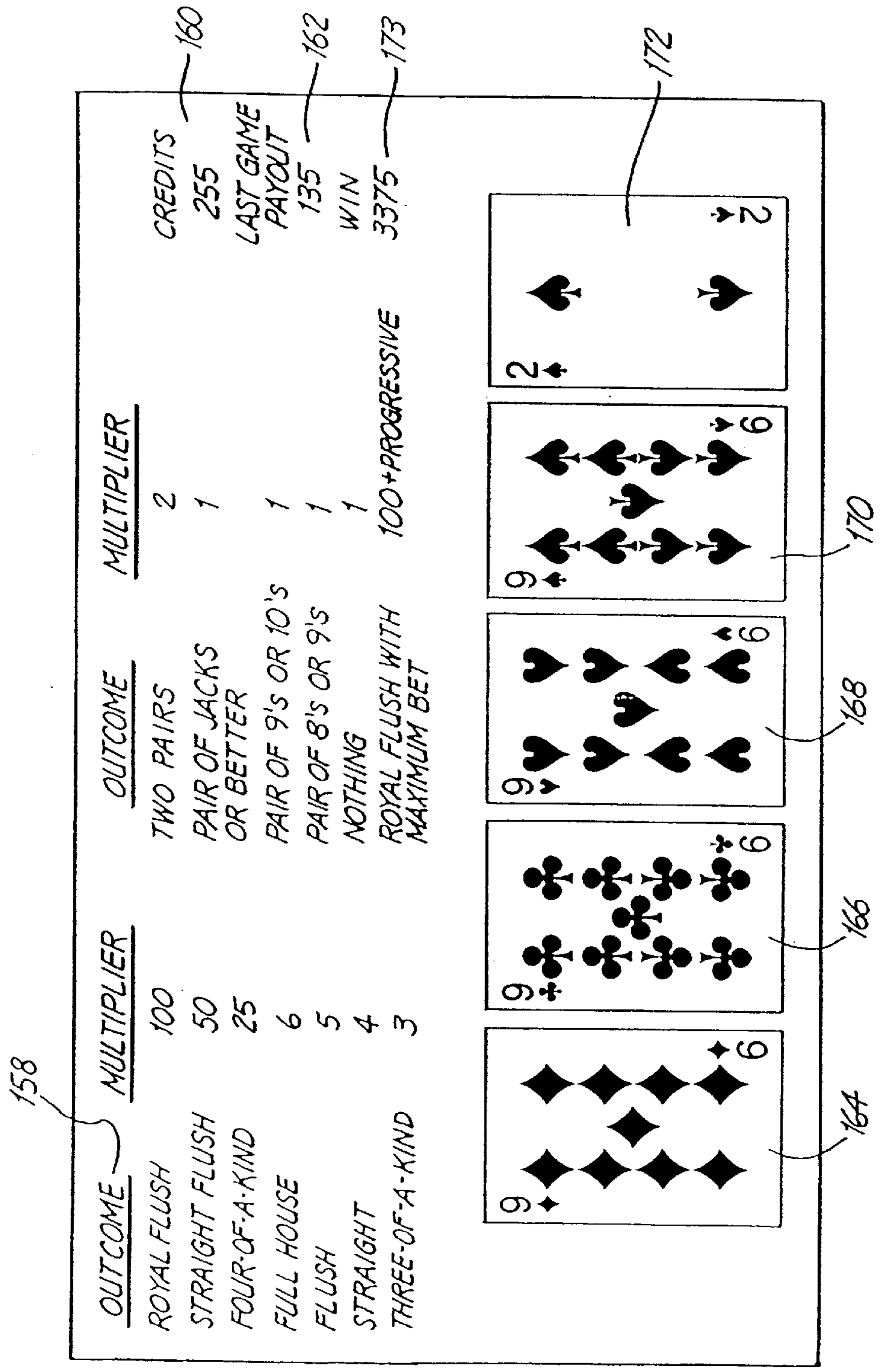
FIG. 7 is an illustration of an outcome of play of the second segment of the preferred game of the present invention.

A video representation of the selected hand is shown in FIG. 7. In this example, the second segment of the game is stud poker. A visual representation of the total credits 160, as well as the assigned payout value (last game payout) 162 of the last hand in the first segment is provided. Visual representations of each of the five cards 164, 166, 168, 170 and 172, turned face up are provided. The resulting five card hand ranking is compared to a schedule of factors 158 programmed into the MPU and an outcome is determined by multiplying the factor by the last game payout. In this example, the player achieves a four of a kind, which according to the schedule of factors 158 multiplies the value of the last game payout 162 by 25 to arrive at the winning amount 173. The credits 160 are than adjusted to reflect the outcome from the second segment. The player can depress the "cash out" button 60 and collect the winnings.

In another embodiment of the present invention, the payout is further enhanced by paying a progressive jackpot if the maximum bet is placed, and a royal flush (ace, king, queen, jack and ten of the same suit) is achieved. It is contemplated that 100% of a progressive jackpot would be awarded to such a hand. In other embodiments, lower ranking poker hands, such as a straight flush would qualify for 20% of the progressive jackpot, for example.

In order to maximize the appeal of a progressive jackpot feature, it would be desirable to pool a small percentage of the bets placed on a plurality of machines to fund the progressive jackpot. For example, it would be desirable to set aside about two percent of the coin in, and hook up a bank of video wagering games so that the prize pool climbs quickly.

The invention may also be generally described as a method of scoring a video wagering game where a payout may be provided to a player, the game comprising at least a first segment and a second segment and:

placing a first wager to participate in a video wagering game;

playing the first segment of the video wagering game;

continuing play of first segments until at least one predetermined outcome occurs in the play of the first segment;

playing the second segment of the video wagering game when the at least one condition has occurred in the play of the first segment;

wherein a base amount is multiplied by a factor determined by an outcome in the second segment, and wherein the factor is at least one;

wherein said base amount is selected from the group consisting of:

1) a payout from the first wager;
2) a portion of a payout from the first wager;
3) an amount equal to the first wager;
4) an amount equal to a portion of the first wager; and
5) an amount equal to a combination of the first wager and a payout from the first wager or portion of the combination of the first wager and a payout from the first wager;

33. and using said base amount multiplied by the factor to provide an enhanced payout to the player. The method may have the enhanced payout comprise a first payout from said at least one predetermined outcome occurring in the play of the first segment added to said base amount multiplied by the factor. The method individually may have the enhanced payout comprise the amount wagered plus said base amount multiplied by the factor, and the base amount may equal a payout from the first wager, a portion of a payout from the first wager, an amount equal to the first wager, an amount equal to a portion of the first wager, an amount equal to a combination of the first wager and a payout from the first wager, or a portion of the combination of the first wager and a payout from the first wager. The method particularly desirably may have the first segment comprise stud poker, draw poker, Let It Ride® poker, Caribbean Stud® poker, two card high low, or the like. Similarly, the second segment may comprise a variation of poker.

The method of the invention may also be considered as a method of scoring a video wagering game where a payout may be provided to a player, the game comprising at least a first and second segment and:

a player placing a first wager to participate in a video wagering game; providing a video display cabinet, a device mounted in the cabinet for accepting wagers, a visual display mounted in the cabinet, a plurality of player controls mounted in the cabinet, a microprocessor, RAM and ROM storage, accessible by the microprocessor and located in the cabinet; wherein a program is stored in ROM for playing a video wagering game with a first segment and second segment, and a device for dispensing at least one payout; and a plurality of data busses for providing communication between the microprocessor and a) the visual display, b) player controls and c) device for dispensing said at least one payout;

the player activating player controls which activating causes the microprocessor to display or activate the first segment of the game;

the player playing the first segment of the video wagering game, wherein the player controls are optionally manipulated by the player to participate in the game;

upon the occurrence of at least one predetermined condition in the play of first segment, the microprocessor causing the second segment of the game to be activated;

the player participating in the second segment of the video wagering game; wherein a base amount used to enhance a payout is enhanced by a factor determined by an outcome in the second segment, and wherein the factor is at least one;

multiplying said base amount by the factor determined in the second segment, wherein said base amount is selected from the group consisting of:

1) a payout from the first wager;
2) a portion of a payout from the first wager;
3) an amount equal to the first wager;
4) an amount equal to a portion of the first wager; and
5) an amount equal to a combination of the first wager and a payout from the first wager or portion of the combination of the first wager and a payout from the first wager;

and paying the player an enhanced payout.

The method may have the enhanced payout and the base amount comprise those options listed above and other variations within the design skill of the ordinarily skilled artisan.

The method may have a payout from at least one predetermined winning outcome from the second segment is augmented with a progressive jackpot. For example, the progressive jackpot payout may be 100 percent of the progressive jackpot when the player obtains a royal flush (or five-of a-kind in a wild card game), and a maximum bet has been placed. The method may have the set of predetermined winning conditions comprise achieving a defined number of winning outcomes in the first segment, and further comprising the step of providing a meter for keeping track of a number of winning outcomes. The factor may specifically be a whole positive integer.

Workers skilled in the art will recognize that the above example is not intended to limit the scope of the invention, and that other examples exist which do not depart from the spirit and scope of the invention, and are encompassed by the appended claims.

What is claimed is:

1. A method of scoring a video wagering game, the game comprising at least a first and second segment, the method comprising the steps of:

placing a wager to participate in a video wagering game;

playing the first segment of the video wagering game;

continuing play of the first segment until at least one predetermined condition has been met;

assigning a payout based on at least one predetermined winning outcome of the first segment;

playing the second segment of the video wagering game when the at least one predetermined condition has been met;

wherein said payout of the first segment is enhanced by a second segment factor that is randomly determined by a predetermined outcome in the second segment, and wherein the second segment factor is at least one;

multiplying the amount of the payout of the first segment by the second segment factor determined in the second segment; and paying at least the enhanced payout, wherein the enhanced payout equals the assigned payout from the first segment times the factor.

2. The method of claim 1 wherein the first segment comprises poker.

3. The method of claim 1 wherein corresponding factors for outcomes in the set of factors include different multipliers and wherein at least some corresponding factors are between 1 and 1000.

4. The method of claim 1 wherein the second segment consists of a single game play.

5. The method of claim 1 wherein the first segment comprises a video slot reel game.

6. The method of claim 1 wherein the set of factors include different multipliers.

7. The method of claim 6 wherein at least some corresponding factors are between 1 and 1000.

8. The method of claim 1 wherein the second segment comprises poker.

9. The method of claim 1 wherein a payout from at least one predetermined winning outcome from the second segment is augmented with a progressive jackpot.

10. The method of claim 1, wherein the progressive jackpot payout is 100 percent of the progressive jackpot when the player obtains a royal flush, and a maximum bet has been placed.

11. The method of claim 1, wherein the set of predetermined winning conditions comprises nine winning outcomes in the first segment.

12. The method of claim 1, wherein the set of predetermined winning conditions comprises achieving a defined number of winning outcomes in the first segment, and further comprising the step of providing a meter for keeping track of a number of winning outcomes.

13. The method of claim 12, wherein the first segment is poker, and the defined number of winning outcomes is 9.

14. The method of claim 1, wherein the set of predetermined conditions includes achieving nine winning outcomes on play of the first segment when a maximum bet is placed.

15. The method of claim 1 wherein the factor is an integer.

16. The method of claim 1, wherein corresponding factors comprise at least some different multipliers among the corresponding factors with at least some of the corresponding factors being within the range of 1 to 1000.

17. A method of scoring a video wagering game having a first segment and a second segment, comprising:

a player placing a wager to participate in a video wagering game;

providing (a) a video display cabinet, (b) a device for accepting a wager, the device being mounted in the cabinet, (c) a visual display mounted in the cabinet, (d) a plurality of player controls mounted in the cabinet, (e) a microprocessor located in the cabinet with memory storage; wherein a program is stored in the memory for playing a video wagering game with a first segment and a second segment, and (f) a device for dispensing payouts;

wherein the second segment is a bonus segment where factors are randomly determined from a set of at least three factors and the factors are used to enhance an award in the first segment with values comprising the factor multiplying said wager the visual display, player controls and device for dispensing payouts to the communications with the microprocessor;

the player activating a player control which causes the microprocessor to display the first segment of the game;

a player playing the first segment of the game, wherein the player controls are optionally manipulated by the player to participate in the game;

upon the happening of a set of predetermined conditions, the microprocessor assigning a payout to the first segment and causing the second segment of the game to be displayed;

the player participating in the second segment of the game; and wherein an outcome of the second segment is enhanced by a factor determined by a predetermined outcome in the second segment, wherein the factor is at least one, and the payout of the first segment, wherein the minimum payout of the second segment is one for one; and paying the player an amount equal to the first segment payout times the factor.

18. The method of claim 17 wherein the first segment of the game comprises video poker.

* * * * *

UNITED STATES PATENT AND TRADEMARK OFFICE

CERTIFICATE OF CORRECTION

PATENT NO. : 6,796,904 B2
DATED : September 28, 2004
INVENTOR(S) : Mark L. Yoseloff It is certified that error appears in the above-identified patent and that said Letters Patent is hereby corrected as shown below:

Column 7,
Line 7, change "play The" to -- "play. The --.

Column 9,
Line 34, change "a" to -- an --.
Line 34, delete the word "predetermined".
Line 39, change "payout, wherein" to -- payout to the player, wherein --.

Column 10,
Line 39, change "to the" to -- are in --.
Line 42, change "control" to -- controls --.
Line 48, change "a set of" to -- at least one --.
Line 48, change "conditions" to -- condition --.
Line 53, change "second" to -- first --.

Signed and Sealed this

Eighth Day of February, 2005

JON W. DUDAS
*Director of the United States Patent and Trademark Office*